United States Patent
McFaddin et al.

(10) Patent No.: US 7,456,241 B2
(45) Date of Patent: Nov. 25, 2008

(54) MICROFINE ADHESIVE POWDERS AND PROCESS

(75) Inventors: Douglas C. McFaddin, Cincinnati, OH (US); David O. Bostrom, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 528 days.

(21) Appl. No.: 11/209,506

(22) Filed: Aug. 23, 2005

(65) Prior Publication Data

US 2006/0014900 A1    Jan. 19, 2006

Related U.S. Application Data

(63) Continuation-in-part of application No. 10/455,030, filed on Jun. 5, 2003, now abandoned.

(51) Int. Cl.
C08F 8/00 (2006.01)
C08L 23/04 (2006.01)

(52) U.S. Cl. ........................ 525/192; 525/240

(58) Field of Classification Search ................ 525/192, 525/240
See application file for complete search history.

(56) References Cited

U.S. PATENT DOCUMENTS

| | | | |
|---|---|---|---|
| 3,422,049 A | 1/1969 | McClain et al. | |
| 3,432,483 A | 3/1969 | Peoples et al. | |
| 3,746,681 A | 7/1973 | McClain et al. | |
| 3,970,719 A | 7/1976 | Edmonds, Jr. | |
| 3,987,122 A | 10/1976 | Bartz et al. | |
| 4,039,632 A | 8/1977 | Edmonds, Jr. | |
| 4,087,587 A | 5/1978 | Shida et al. | |
| 4,298,712 A | 11/1981 | Machonis, Jr. et al. | |
| 4,487,885 A | 12/1984 | Adur et al. | |
| 4,774,144 A | 9/1988 | Jachec et al. | |
| 5,017,714 A | 5/1991 | Welborn, Jr. | |
| 5,324,820 A | 6/1994 | Baxter | |
| 5,367,022 A | 11/1994 | Kiang et al. | |
| 5,516,583 A | 5/1996 | Zhang et al. | |
| 5,900,465 A | 5/1999 | Nishikawa et al. | |
| 6,096,435 A | 8/2000 | Maekawa et al. | |
| 6,171,933 B1 | 1/2001 | Xu et al. | |
| 6,177,516 B1 | 1/2001 | Hudak | |
| 6,207,754 B1 | 3/2001 | Yu | |

OTHER PUBLICATIONS

Ross, J.F., et al.: "An Improved Gas-Phase Polypropylene Process" *Ind. Eng. Chem. Prod. Res. Dev.* (1985) 24:149-154. Kirk-Othmer's *Encyclopedia of Chemical Technology:* 3rd Edition, pp. 453-467. *Encyclopedia of Polymer Science and Technology:* vol. 13: pp. 464-530 (1988).

*Primary Examiner*—Nathan M Nutter
(74) *Attorney, Agent, or Firm*—William A. Heidrich; Gerald A. Baracka

(57) ABSTRACT

Microfine powder adhesive blends are provided. The powders are comprised of a polyolefin base resin component and acid or acid derivative functionalized polyolefin component with one or more optional components. The microfine powders are produced from melt blended adhesive products using a dispersion process and have median particle sizes from 5 to 250 micrometers.

12 Claims, No Drawings

MICROFINE ADHESIVE POWDERS AND PROCESS

CROSS REFRENCE TO RELATED APPLICATIONS

This is a continuation-in-part of application, Ser. No. 10/455,030 filed Jun. 5, 2003 now abandoned.

BACKGROUND OF THE INVENTION

1. Field of the Invention

The invention relates to adhesive powders and, more specifically, to microfine powders of adhesive blends wherein the particles are spherical or substantially spherical in shape and comprised of polyolefin base resins and acid or acid derivative functionalized polyolefins and to a dispersion process for their preparation.

2. Description of the Prior Art

Adhesive blends, commonly referred to as tie-layer adhesives, designed to improve adhesion between polyolefins and dissimilar substrates, such as polyamides, EVOH copolymers, metals and the like, are well known. These adhesive blends typically contain a polyolefin base resin as the predominant component and a modified polyolefin containing carboxylic acid or anhydride functionality, e.g., polymers grafted with maleic anhydride, as the minor component. Optionally, one or more other polymeric materials, including rubbers, are included in the adhesive blends. Representative adhesive blends of the above types are described in U.S. Pat. Nos. 4,087,587; 4,298,712; 4,487,885; 4,774,144 and 5,367,022.

Adhesive blends of the above types are obtained by melt blending the components and can be used directly in extrusion or coextrusion processes. More typically, however, for commercial applications the melt blends are formed into pellets which can be easily stored and used at a later date by the processor.

Thermoplastic resin powders are widely used in industry for a variety of applications. For example, powdered thermoplastic resins are used to coat articles by dip coating in either a static or fluidized bed or by powder coating wherein the powder is applied by flame or electrostatic spraying or dusting. In recent years increasing emphasis has been placed on the use of powders which chemically bond to the surface of the structures, e.g., metal surfaces, such as aluminum or steel or polymer surfaces, such as nylon, ethylene-vinyl alcohol (EVOH) copolymers or polyolefins. In the case of materials like steel, coating with these powders provides protection against corrosives and other reactive materials.

For certain applications, the shape and size of the powder particles are important considerations. For example, for most effective fluidization and dry spraying it is generally considered advantageous to use powders which have a fairly narrow particle size distribution and wherein the particles are spherical or substantially spherical in shape. Powders produced by mechanical grinding or pulverization typically have particles which are irregular in shape and particle size distributions which are quite broad.

Particle size distribution is determined using U.S. Standard Sieves or light scattering techniques and, depending on the method used, will be reported in mesh size or microns. The inverse relationship between the sieve size (mesh number) and particle size (in microns or micrometers) is well documented and conversion tables are available. The shape of the particles is ascertained from photomicrographs of the powders. Particle shape has a marked influence on the bulk density of the powders and its handling properties.

It would be highly advantageous if microfine adhesive powders which exhibit superior adhesion to a variety of substrates were available. It would be even more advantageous if the microfine powders were comprised of small particles which are spherical or substantially spherical in shape. It would be particularly advantageous if microfine powders having narrow particle size distributions were available. These and other advantages are achieved with the microfine adhesive blend powders produced by the process of the present invention which will be described in more detail to follow.

SUMMARY OF THE INVENTION

Highly useful microfine adhesive powders having a median particle size from 5 to 250 micrometers and, more preferably from 10 to 100 micrometers, and comprised of 40 to 99 weight percent (wt. %) polyolefin base resin and 1 to 60 wt. % derivative functionalized polyolefin are provided. Functionalized polyolefins contain acid or acid derivative functionality. The blends may additionally contain up to 30 wt. % of an elastomeric component. The microfine powders, which are comprised of spherical or substantially spherical particles, are produced by a dispersion process wherein particulate adhesive blends obtained by melt blending are combined with a nonionic surfactant and a polar liquid medium containing at least 50 wt. % water and the mixture heated above the melting points of the adhesive blend components with agitation to form a dispersion of the adhesive blend in the polar liquid medium. The dispersion is then cooled below the melting points of the adhesive blend components and the powder recovered. In a preferred embodiment the weight ratio of polar liquid medium to adhesive blend is from 1:1 to 9:1 and the nonionic surfactant is a block copolymer of ethylene oxide and propylene oxide present at a weight ratio (nonionic surfactant:adhesive blend) of 0.05:1 to 5:1.

Preferably, the adhesive blend is comprised of a polyolefin base resin selected from the group consisting of ethylene homopolymers, propylene homopolymers, copolymers of ethylene and propylene, copolymers of ethylene and $C_{4-8}$ α-olefins and ethylene-vinyl acetate copolymers. The acid or acid derivative functionalized polyolefin is preferably a maleic anhydride grafted polyolefin selected from the group consisting of ethylene homopolymers, copolymers of ethylene and $C_{3-8}$ α-olefins, propylene homopolymers and propylene-ethylene copolymers.

In one highly useful embodiment of the invention pelletized adhesive blends are converted to microfine powders, particularly microfine powders having a median particle size of 10 to 60 micrometers.

DETAILED DESCRIPTION OF THE INVENTION

The microfine adhesive powders of the invention are comprised of one or more polyolefin base resins and one or more acid or acid derivative functionalized polyolefins. Adhesive blends of this type are known and widely used as tie-layers to bond layers of dissimilar materials in multilayer constructions using extrusion or coextrusion procedures.

Adhesive blends utilized to obtain the microfine adhesive powders of the invention are comprised of (a) 40 to 99 wt. % polyolefin base resin and (b) 1 to 60 wt. % functionalized polyolefin. The functionalized polyolefins contain acid or acid derivative functional groups and are also referred to herein as the modified polyolefins. The acid or acid derivative functionality may be incorporated by copolymerization or grafting. In one highly useful embodiment, the modified polyolefin is a graft-modified polyolefin obtained by grafting an ethylenically unsaturated carboxylic acid or acid derivative, such as maleic anhydride, onto a polyolefin polymer backbone. In a preferred embodiment the adhesive blend powders are comprised of 70 to 98 wt. % base resin and 2 to 30 wt. % modified polyolefin.

Polyolefins useful for the base resin include ethylene homopolymers, propylene homopolymers, copolymers of ethylene and propylene, copolymers of ethylene and $C_{4-8}$ α-olefins and ethylene-vinyl acetate copolymers. Ethylene homopolymers and ethylene-$C_{4-8}$ α-olefin copolymers include low density polyethylene (LDPE), linear low density polyethylene (LLDPE), medium density polyethylene (MDPE), high density polyethylene (HDPE), very low density polyethylene (VLDPE) and ultra low density polyethylene (ULDPE). LDPE and LLDPE are defined as having densities in the range 0.910 to 0.925 $g/cm^3$. MDPE is defined as having a density of 0.926 to 0.940 $g/cm^3$. HDPE is defined as having a density of 0.941 $g/cm^3$ and above. VLDPE is defined as having a density in the range of 0.900 to 0.910 $g/cm^3$ and ULDPE is defined as having a density of 0.860 to 0.899 $g/cm^3$. Densities are determined in accordance with ASTM D 792. The base resin can be a mixture of two or more polyolefins.

Ethylene-vinyl acetate copolymers useful as base resins can contain from 6 to 35 wt. % vinyl acetate and, more preferably, contain 10 to 28 wt. % vinyl acetate.

Ethylene homopolymers and copolymers of the above types have melt indexes (MIs) of about 2 to 4000 g/10 min and, more preferably, 5 to 500 g/10 min. Still more preferred are homopolymers and copolymers with MIs from 5 to 200 g/10 min. MIs are determined using ASTM D 1238, Condition E.

Useful ethylene copolymers can also include the so-called plastomers obtained using metallocene or "single site" catalysts having at least one cyclopentadienyl or analogous ligand coordinated to a transition metal cation. Metallocene catalysts and polymerization processes are described in U.S. Pat. No. 5,017,714 which is incorporated herein by reference. Plastomers which can be used include copolymers of ethylene and $C_{4-8}$ α-olefin comonomers. Ethylene generally comprises from about 87 to about 97.5 mole % with the α-olefin comprising about 2.5 to 13 mole % of the plastomer. Plastomers will typically have densities from 0.86 to 0.92 $g/cm^3$. Most preferably, plastomer densities will be from 0.86 to 0.90 $g/cm^3$. Plastomer copolymers are described in more detail in U.S. Pat. No. 6,207,754 which is incorporated herein by reference.

Ethylene-α-olefin plastomers generally have MIs from 10 g/10 min up to about 50 g/10 min and, more typically, from 20 to 40 g/10 min. Copolymers of ethylene and butene-1, hexene-1 and octene-1 are particularly useful plastomers. Such plastomers are available from commercial sources. A useful plastomer with density and MI within the above-recited ranges is an ethylene-octene-1 copolymer sold under the designation EG8407 (DuPont Dow Elastomers).

Ethylene copolymers having a network structure believed to be formed, at least in part, by association of hard and soft phases present in the resin may also be advantageously used. Ethylene copolymers having a network structure and the processes by which they are prepared and characterized are described in detail in U.S. Pat. No. 6,171,933 which is incorporated herein in its entirety by reference.

Useful propylene polymers can include homopolymers of propylene, i.e., polypropylene (PP) and copolymers of propylene with up to about 25 wt. % ethylene. Crystalline, isotactic propylene homopolymers are known and commercially available. All of these PP resins, which can vary in melt flow rate (MFR) and physical properties, can be employed as the base or as one of the components of the base resin to obtain the powder adhesives of the invention.

Copolymers of propylene with ethylene, random and block, are also known and can be used to produce useful adhesive powders in accordance with this invention. Numerous polymerization procedures are described in the prior art for the preparation of random and block copolymers. Block copolymers, for example, can be made in accordance with the processes of U.S. Pat. Nos. 3,970,719 or 4,039,632.

The random copolymers will generally contain from 1 to 10 wt. % ethylene and, more preferably, from 1 to 5 wt. % ethylene. The block copolymers will generally contain from 5 to 25 wt. % ethylene and, more preferably, from 5 to 20 wt. % ethylene. Random and block propylene copolymers generally have crystallinity contents of from 45 percent to 65 percent and, more typically, from 50 to 65 percent. Small amounts of other polymerizable monomers may be included with the propylene and ethylene if desired.

Propylene homopolymers and copolymers of the above types are generally discussed in Volume 16 of Kirk-Othmer's *Encyclopedia of Chemical Technology*, 3rd Edition, pp 453-467 and in Volume 13 of *Encyclopedia of Polymer Science and Engineering*, 1988, pp 464-530, the contents of which are incorporated herein by reference.

Still another type of propylene copolymer which can be used for the base resin are the so-called impact copolymers. Impact copolymers are intimate mixtures comprised of a continuous crystalline phase (propylene homopolymer) having an amorphous or rubbery phase (ethylene-propylene copolymer) dispersed therein. While impact copolymers can be produced by physically blending the individual polymer components, they are most commonly produced in gas-phase, stirred-bed polymerization processes which utilize two reactors connected in series and using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers. Gas phase polymerizations of this type are described in the article by Ross, et al., entitled "An Improved Gas-Phase Polypropylene Process" in *Ind. Eng. Chem. Prod. Res. Dev.* 1985, 24: 149-154, which is incorporated herein by reference.

An acid or acid derivative functionalized polyolefin is included with the above-described polyolefin base resin(s) to obtain the adhesive blends utilized to produce the microfine powders of the invention. The acid or acid derivativized polyolefin may be produced by copolymerizing an acid or acid derivative monomer with an α-olefin or α-olefin mixture or, as is more typically the case, by grafting the monomer onto a polyolefin, e.g., polyethylene.

Acid or acid derivative monomers which can be utilized are ethylenically unsaturated carboxylic acids or acid derivatives, such as acid anhydrides, esters, salts or the like. Useful monomers include but are not limited to: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo (2.2.1)hept-5-ene-2,3-dicarboxylic acid anhydride, tetrahydrophthhalic anhydride, norborn-5-ene-2,3-dicarboxylic acid anhydride, and x-methylbicyclo (2.2.1)hept-5-ene-2,3-dicarboxylic acid anhydride(XMNA).

Modified polyolefins obtained by copolymerization can include copolymers of $C_{2-8}$ α-olefins, particularly ethylene, with the above-defined acid or acid derivative monomers. Copolymers of ethylene with acrylic acid, methacrylic acid, maleic acid, fumaric acid and maleic anhydride can advantageously be employed for preparation of the adhesive powders.

In a preferred embodiment, the functionalized, i.e., modified, polyolefin is obtained by grafting an ethylenically unsaturated carboxylic acid or derivative, particularly maleic anhydride, onto a polyolefin backbone. The grafting may be accomplished using known procedures in solution, in a fluidized bed reactor, by melt grafting or by irradiation grafting. As used herein, the term grafting denotes covalent bonding of the grafting monomer to the polymer chain.

Highly useful modified polyolefins for the adhesive blend powders of the invention are conveniently prepared by grafting the polyolefin in the substantial absence of a solvent. This can be accomplished in a shear-imparting reactor, such as an extruder/reactor. Twin screw extruder/reactors such as those marketed by Coperion (formerly Werner-Pfleiderer) under the designations ZSK-53, ZSK-83 and ZSK-92 are commonly used. A free radical generating catalyst, such as a peroxide catalyst, can be employed but is not necessary. The grafting reaction is carried out at a temperature selected to minimize or avoid rapid vaporization and consequent losses of the graft monomer and any catalyst that may be employed. The graft monomer concentration in the reactor is typically about 1 to about 5 wt. % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. For example, if di-t-butyl peroxide and 2,5-dimethyl-2,5-di-(t-butylperoxy)hexane are used, temperatures within the reactor are maintained at or below about 220° C. Examples of useful peroxide catalysts include: 1,1-bis(t-butylperoxy)cyclohexane; n-butyl-4,4-bis(t-butylperoxy-valerate); 1,1-bis(t-butylperoxy)-3,3,5-trimethylcyclohexane; 2,2-bis(t-butyl-peroxy)butane; dicumylperoxide; t-butylcumylperoxide; α,α'-bis(t-butylp-eroxy-preoxy-isopropyl)benzene; di-t-butylperoxide; 2,5-dimethyl-2,5-di(t-butylperoxy)hexane; and the like. The grafting monomer and any catalyst used are preferably added in neat form to the extruder/reactor.

Polyolefins grafted in accordance with the above procedures include homopolymers and copolymers of ethylene and propylene or mixtures thereof. Particularly useful are ethylene homopolymers, copolymers of ethylene with $C_{3-8}$ α-olefins, propylene homopolymers and propylene-ethylene copolymers, including random propylene-ethylene copolymers, block copolymers of propylene and ethylene and the so-called impact ethylene-copolymers. While the polyolefin used for the functionalized component may be the same polyolefin used for the base resin, the two polyolefins may be different. Graft monomer contents, i.e., the amount of unsaturated acid or acid derivative reacted with the polyolefin, generally range from about 0.3 up to about 4 wt. %. Highly useful modified polyolefins for the invention have from 0.5 to 3 wt. % graft monomer reacted. In a particularly useful embodiment of the invention the functionalized polyolefin is polyethylene grafted with MAH. HDPE, LLDPE and impact copolymers grafted with MAH are especially useful functionalized polyolefins. The MI of the MAH grafted component will typically range from 0.5 to 1000 g/10 min. MIs of the modified polyolefin are more preferably in the range 0.5 to 100 g/10 min.

Other polymers may be included with the base resin and functionalized polyolefin to form the adhesive blends. For example, elastomers which are compatible with the graft-modified polyolefin and other polyolefin compounds may be advantageous. Elastomeric copolymers of ethylene and particularly copolymers where ethylene is the predominant monomer are especially useful for this purpose. Such polymers include ethylene-propylene rubbers (EPRs) and ethylene-propylene-diene (EPDM) rubbers where ethylene contents are typically 60 wt. % or greater. As used herein, the terms "elastomer" or "elastomeric" refers to products having rubber-like properties and little or no crystallinity. When present, the elastomeric component may be present in an amount up to 30 wt. %. Most commonly the elastomers constitute from 1 to 20 wt. % of the blend and, most preferably 2 to 15 wt. % of the blend.

In addition to the EPR and EPDM polymers mentioned above, ethylene-ester copolymers having elastomeric character and wherein the ester comonomer corresponds to the formula:

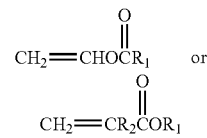

where $R_1$ is an alkyl group and $R_2$ is hydrogen or methyl can also be used when formulating the adhesive blends. Whereas copolymers of ethylene with vinyl acetate and n-butyl acrylate are especially advantageous, other useful elastomeric copolymers wherein the comonomer is methyl acrylate, methyl methacrylate, vinyl propionate, vinyl butyrate and the like can be employed. Ethylene-vinyl acetate copolymers incorporated for their rubbery characteristics typically have higher vinyl acetate content then copolymers from the same family used as the base resin.

Still other elastomers not derived from ethylene may be included in the adhesive blends. Examples of such elastomers include poly(isobutylene), copolymers of isobutylene and isoprene, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

The polyolefin base resin(s), modified polyolefin(s) and any optional components or additives present in the adhesive blend are combined and melt blended using conventional techniques. For most applications the adhesive blends will also contain one or more antioxidants, thermal stabilizers, UV inhibitors or the like. The type and amount of these additives will depend on the end use application. These additives and others may be added as the adhesive blend components are being melt blended or pre-incorporated with either the base resin or modified polyolefin components before the final melt blending operation, for example, in a masterbatch. The melt blending operation can be carried out using a Banbury mixer or extruder.

The final form of the adhesive blend obtained after melt blending, i.e., the solid particulate product, will depend on the finishing equipment. For example, the melt blend can be extruded through suitable dies to produce ropes, strands or rods. In most commercial operations the melt blended product is extruded through suitable dies and pelletized using an underwater or strand pelletizer. Pellets produced in this manner generally range in size from 1.5 to 5 mm, i.e., 1500 to 5000 micrometers. Whereas any of the above described particulate products can be further mechanically processed, i.e., chipped or ground by cryogenic or other means, to produce chips, flakes or powders, the particles produced in this manner have irregular shapes and generally have a broad particle size distribution and are not well suited for fluidization and dry spraying.

As employed herein, the term particulate refers to any of the above described solid forms of melt blended adhesive blend products. Any of the above described particulate forms comprised of large irregularly shaped particles are readily converted to microfine powders in accordance with the process of the invention.

To obtain the microfine adhesive blend powders, a dispersion technique is employed. For this process one of the above particulate forms of the melt blended polyolefin base resin and functionalized polyolefin are heated above the melting point of the adhesive blend in a liquid medium in the presence of a nonionic surfactant and vigorously agitated to produce a dispersion. The dispersion is then cooled to below the softening point of the blend and the microfine powder recovered. Such dispersion procedures are described in U.S. Pat. Nos. 3,422,049; 3,432,483 and 3,746,681 which are incorporated herein by reference.

For the dispersion process, the melt blended particulate adhesive blend comprising one or more base resins, one or more functionalized polyolefins and any optional additives, is charged to a reactor with a polar liquid containing at least 50 wt. % water and a nonionic surfactant and the mixture is heated above the melting point of the adhesive blend components while forming a dispersion using conventional dispersing procedures. The dispersing apparatus may be any device capable of delivering sufficient shearing action to the mixture at elevated temperature and pressure. Conventional propeller stirrers designed to impart high shear and which are commercially available can be used for this purpose. The reactor may also be equipped with baffles to assist in dispersion formation. Agitation rates can vary over wide limits, but the speed of the stirrer will usually be controlled so that the tip speed is between about 500 and 3500 ft/min and, more preferably, 750 and 3000 ft/min.

The process is carried out in an autoclave since this permits the process to be conducted at elevated temperature and pressure. In batch operations, the adhesive blend, e.g., pelletized adhesive blend product, is charged to the autoclave and is heated to a temperature above the melting point of the blend components. While the temperature will vary depending on the specific base resins and modified polyolefin polymers being used, it will typically range from about 90° C. to 250° C. Since the fluidity of polymers is temperature related, it may be desirable to carry out the process at temperatures substantially above the melting point of the adhesive blend to facilitate dispersion and achieve the desired droplet size. Temperatures should not, however, exceed the thermal degradation temperature of the polymers.

Agitation is commenced after the desired temperature is reached and is continued until a dispersion having the desired droplet size is produced. The length of time required will vary depending on the temperature, agitation rate, amount and type of surfactant, and other process variables, but generally ranges from about 3 minutes to about 1 hour. Most generally, stirring is maintained for a period from 5 to 30 minutes.

Other polar liquids which are not solvents for the adhesive blend components may also be used with the water to form the dispersions. These polar mediums are hydroxylic compounds and can include alcohols and polyols and mixtures thereof. It is particularly advantageous to use water as the dispersing medium or a medium where water is the major component. The weight ratio of the liquid medium, i.e., water or the combination of water and other polar liquid to adhesive blend will range from about 1:1 to about 9:1 and, more preferably, from 1:1 to 5:1. The pressure of the process is not critical so long as a liquid phase is maintained and can range from about 1 up to about 100 atmospheres. The process can be conducted at autogenous pressure or the pressure can be adjusted to exceed the vapor pressure of the liquid medium at the operating temperature. Most generally, with aqueous dispersions the pressure will range from about 5 to 30 atmospheres.

To obtain suitable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most contain a major portion by weight of ethylene oxide and are obtained by polymerizing ethylene oxide onto preformed polyoxypropylene segments. The weight ratio of nonionic surfactant to adhesive blend can range from about 0.05:1 to 5:1. Most preferably, the weight ratio of nonionic surfactant to adhesive blend is from 0.1:1 to 0.5:1.

One class of useful nonionic surface active agents is manufactured and sold by BASF Corporation under the trademark PLURONIC. These products are obtained by polymerizing ethylene oxide onto the ends of a preformed polymeric base of polyoxypropylene. Both the molecular weight of the polyoxypropylene base and the polyoxyethylene segments can be varied to yield a wide variety of products. One such product found to be suitable for the process is designated as F-98 wherein a polyoxypropylene (average molecular weight of 2,700) polymerized with ethylene oxide to give a product of molecular weight averaging about 13,500. This product contains about 20 wt. % propylene oxide and about 80 wt. % ethylene oxide. Other effective PLURONIC surfactants include F68 (M.W. 8,400, 20% propylene oxide, 80% ethylene oxide), F-88 (M.W. 11,250, 20% propylene oxide, 80% ethylene oxide), F-108 (M.W. 16,250, 20% propylene oxide, 80% ethylene oxide), and P-85 (M.W. 4,500, 50% propylene oxide, 50% ethylene oxide). These products, all containing at least about 50 wt. % ethylene oxide and having molecular weights of at least about 4,500, are highly effective as dispersing agents for the preparation of the adhesive blend powders of the invention.

Another class of useful nonionic surfactants is sold under the trademark TETRONIC. These surfactants are prepared by building propylene oxide block copolymer chains onto an ethylenediamine nucleus and then polymerizing with ethylene oxide. TETRONIC 1107 and TETRONIC 908 are most effective for the present process. TETRONIC 1107 has a 30 wt. % polyoxypropylene portion of about 4,500 molecular weight polymerized with a 70 wt. % oxyethylene portion to give an overall molecular weight of about 15,000. TETRONIC 908, on the other hand, has a 20 wt. % polyoxypropylene portion of about 2,900 molecular weight polymerized with an 80 wt. % oxyethylene portion to give an overall molecular weight of about 27,000.

When suitable dispersion is achieved, i.e., the dispersion has the desired droplet size, heating is terminated and the mixture is allowed to cool to below the melting point of the adhesive blend while maintaining agitation. When sufficiently cooled, the adhesive blend powder is recovered using conventional recovery, washing and drying techniques such as those disclosed in U.S. Pat. Nos. 3,422,049, 3,432,483 and 3,746,681 which are incorporated herein by reference.

Adhesive powders produced in accordance with the above-described dispersion process are obtained as microfine powders wherein the powder particles are spherical or substantially spherical in shape and the median particle size is in the range 5 to 250 micrometers (μm). In a highly useful embodiment of the invention, microfine adhesive powders having median particle sizes from 10 to 100 μm are produced by proper selection and control of dispersion conditions and/or by classifying the powders after production. By eliminating or substantially reducing the number of particles which are smaller or larger than desired, relatively narrow particle size distribution microfine powders are obtained. Particularly useful microfine powders have median particle sizes from 10 to 60 μm. Particle sizes referred to herein are median particle sizes determined by laser light scattering using a Malvern Instruments particle size analyzer. Other methods for particle size analysis, such as a Coulter counter, may also be used.

Depending on the conditions employed for the dispersion process and the particular functionalized polyolefin used, some or substantially all of the functionality of the modified polyolefin may be hydrolyzed. For example, when the functionalized polyolefins are maleic anhydride grafted polyolefins, which are preferred functionalized materials for preparation of the microfine adhesive powders of the invention, substantially all or a portion of the anhydride functionality can be hydrolyzed to carboxylic acid functionality. This will result in the formation of a microfine powder wherein the functionalized polyolefin component has mixed functionality, i.e., both anhydride and carboxylic acid group (where partial hydrolysis has occurred), or only carboxylic acid functionality (where all of the anhydride groups have been hydrolyzed). In the latter case, the microfine adhesive powders would be expected to have essentially the same properties as powders produced by dispersing an adhesive blend where the functionalized polyolefin is a maleic acid or fumaric acid grafted polyolefin. Since the degree of hydrolysis is dependent on reaction conditions, e.g., primarily dispersion time and temperature, a wide variety of adhesive powder products are possible utilizing the above-described process.

The availability of microfine powders which exhibit good adhesion to a variety of substrates is highly useful. Moreover, the ability to produce such powders from commercially available pelletized adhesive blends containing acid or acid derivative functionality without significantly reducing the adhesive properties and, in some cases, even improving adhesion, is particularly advantageous.

The microfine adhesive blend powders are useful in virtually all applications where powders are adhered to a substrate. The use of very small particle size powders, and particularly powders wherein the particles are spherical or substantially spherically shaped, and which contain functionality provides opportunities to utilize the increased surface area to improve interfacial adhesion. The mechanism can be accomplished through several methods. One way to accomplish the adhesion is to fluidize the particles in a containment vessel, carry the particles in the gas stream to the surface to be bonded and bombard the surface using deposition technology. The particles are small and light enough to fluidize efficiently and not separate out of the gas stream. The temperature of the gas stream can be high enough to lower the melt viscosity of the material while keeping the material fluidized. The impact of the heated particles hitting the surface of the substrate causes the particles to flatten and start forming bonds with the surface. The bonding can be both chemical and molecular depending the substrate. The presence of a polyolefin, e.g., polyethylene base resin, will allow molecular interaction to take place while polar structures, i.e., the modified polyolefin, will generate chemical bonding. The increased surface area of the fine particulate will enhance the speed of the bonding. Examples of this would be a fluidization gun where the powders are initially heated to elevated temperatures and transmitted in a hot, gas stream onto the article surface.

The microfine powder adhesive blends may also be used in fluidization systems where the powders are placed in a bed of heated air and articles are passed through the powder system. The attraction of the particles to the structure can be accomplished through energizing the article (if the article is able to conduct energy) or heating the article prior to immersion in the powder bed while providing a alternate potential in the fluidized bed. The use of powders having polarity introduced through the addition of their functionality allows penetration of the material to all portions of the article providing a total encompassing area. Bonding to the structure can be either molecular or chemical depending the article to be immersed. The mass of the article and the area to be bonded are important to the coating technique. The high surface area of the powders and the ability of the particles to better pack due to their spherical or substantially spherical shape provides a greater potential for covering the article, while requiring less energy to fluidize the material.

The following examples illustrate the invention; however, those skilled in the art will recognize numerous variations which are within the spirit of the invention and scope of the claims. For example, microfine powders may be produced and similar results obtained using other adhesive blends.

In the examples, to illustrate the adhesive properties of the microfine powders produced, approximately 0.08 g of powder was evenly distributed over a 1"×1" square portion of a 1"×3" sheet of 5 mil aluminum. A second 1"×3" aluminum sheet was laid over the first sheet and the resulting sandwich then heat sealed using a Sentinel Heat Sealer between two films of 2 mil thick Teflon. Top and bottom bars of the heat sealer were heated to 218° C. unless otherwise specified. The dwell time was 3 seconds unless otherwise specified and the pressure was 40 PSI. Excess flashing was removed and weighed so that the weight of the original powder adhesive remaining between the sheets could be determined. The prepared specimens were pulled apart using a Q-test Tensile Tester to determine adhesion. Samples were run in triplicate and the average reported. The load was divided by the net weight of the adhesive to normalize the adhesion for each test specimen. Results obtained for the microfine powders were compared to the adhesion obtained using a 2 mil cast film sample of the same adhesive blend.

EXAMPLE 1

An adhesive blend was prepared by melt blending 64 wt. % LLDPE, 22 wt. % LDPE and 14 wt. % of MAH grafted HDPE. The melt blended product was extruded and pelletized and had an acid number approximately 3.1 mg KOH/g. The MI was approximately 5.7 g/10 min.

454 Grams of the pelletized, melt blended product, 830 ml. of deionized water and 180 grams of nonionic surfactant (PLURONIC F98) were charged to an autoclave reactor. The reactor was a cylindrical two liter, 4 inch diameter pressure vessel (Parr Instrument Company) equipped with a safety head, a thermowell, a pressure gauge, along with a stirrer bearing and shaft. Attached to the shaft were three impellers containing 6 equally spaced blades. The shaft was turned with a fractional horsepower electric motor.

The reactor and its contents were heated to 215° C. and stirred at 1500 rpm to disperse the molten polymer in the aqueous medium. Stirring was continued for 10 minutes at 215° C. after which time heating was terminated. The reactor contents were discharged through an air-actuated valve into a receiving vessel containing cold water. The resulting microfine adhesive blend powder product was recovered by filtration of the slurry after thorough washing with deionized water. The powder cake was dried at room temperature under constant air circulation for several days. The dried microfine powder was analyzed for particle size. The median particle size, i.e., D50, was 30 μm. D10 and D90 particle sizes were 13 μm and 60 μm, respectively, indicating that 10% of the powder was comprised of particles having a diameter of 13 μm or less and 90% of the powder was comprised of particles having a diameter of 60 μm or less. Photomicrographs of the powders showed the powder particles to be spherical or substantially spherical in shape. Adhesion results obtained using the relatively narrow particle size microfine powder were comparable to that obtained with a cast film produced from the same adhesive blend. Results were as follows:

|  | Weight Normalized Adhesion (lbs force/g. polymer) |
|---|---|
| Powder | 144 |
| Cast Film | 150 |

Unsized Kraft paper was also bonded. Good adhesion between the paper and hot melt powder was observed with failure occurring in the paper substrate.

EXAMPLE 2

Utilizing the procedure described in Example 1, a microfine adhesive blend powder was prepared from pellets of an ethylene copolymer/modified polyethylene blend. The pelletized adhesive blend contained 93.5 wt. % EVA and 6.5 wt. % MAH grafted HDPE. The VA content of the blend was approximately 9 wt. % and acid number was approximately 1.5 mgKOH/g blend. The approximate MI was 3.2 g/10 min. The resulting microfine powder was useful as a hot melt adhesive. The powder had a median particle size of 17 μm and D10 and D90 sizes were 6 μm and 40 μm, respectively. Adhesion values were as follows:

|  | Weight Normalized Adhesion (lbs force/g. polymer) |
|---|---|
| Powder | 132 |
| Cast Film | 106 |

The above results demonstrate that not only is it possible to produce useful microfine adhesive powders but, in some instances, the adhesive powders perform significantly better, on a comparable weight basis, than films of the same adhesive blend. By varying the conditions employed for forming the dispersion, such as changing the surfactant from PLURONIC F98 to PLURONIC F68, the characteristics of the powder produced were changed without significantly affecting the adhesion properties of the adhesive blend. The median particle size of the microfine powder produced under these conditions was 50 μm. D10 and D90 sizes were 25 μm and 170 μm, respectively.

EXAMPLE 3

Following the procedure of Example 1 a microfine powder was prepared from a melt blended pelletized adhesive containing 86 wt. % LDPE and 14 wt. % HDPE grafted with about 2 wt. % MAH. The approximate MI of the sample was 7 g/10 min. The resulting microfine powder was an effective adhesive and had a median particle size of 12 μm. D10 and D90 sizes for the powder were 6 and 25 μm, respectively.

EXAMPLE 4

To demonstrate the ability of the microfine powder adhesives to be used to bond other substrates, the powder of Example 1 was used to adhere nylon 6 film. The procedure used was the same as employed with the Al strips except that 1 mil nylon 6 film was employed and the temperature of the heating bars was maintained at 163° C. for one test and increased to 177° C. for the second test. Adhesion values obtained compared to those obtained at identical seal temperatures with cast films of the same adhesive blend were as follow:

|  | Weight Normalized Adhesion (lbs force/g. polymer) |
|---|---|
| Powder (163° C. seal) | 35 |
| Cast Film (163° C. seal) | 15 |
| Powder (177° C. seal) | 14 |
| Cast Film (177° C. seal) | 18 |

It is apparent from the above data that significantly improved adhesion can be obtained at lower seal temperatures using the microfine powder adhesive blends of the invention.

EXAMPLE 5

The microfine powder of Example 1 was used to adhere stainless steel following the same procedure as used for adhering Al except the heating bar temperature was 232° C. and heating time was 5 seconds. Results were as follow:

|  | Weight Normalized Adhesion (lbs force/g. polymer) |
|---|---|
| Powder | 89 |
| Cast Film | 54 |

EXAMPLE 6

Example 5 was repeated except that the heating bar temperature was lowered to 177° C. with the following results:

|  | Weight Normalized Adhesion (lbs force/g. polymer) |
| --- | --- |
| Powder | 60 |
| Cast Film | 49 |

We claim:

1. A process for producing microfine adhesive blend powders comprising:
   (a) combining a particulate melt blended adhesive blend composition comprised of 40 to 99 weight percent polyolefin base resin selected from the group consisting of ethylene homopolymers, propylene homopolymers, copolymers of ethylene and propylene, copolymers of ethylene and $C_{4-8}$ α-olefins and ethylene-vinyl acetate copolymers and 1 to 60 weight percent maleic anhydride grafted polyolefin selected from the group consisting of ethylene homopolymers, copolymers of ethylene and $C_{3-8}$ α-olefins, propylene homopolymers and propylene-ethylene copolymers with a nonionic surfactant and polar liquid medium containing at least 50 weight percent water;
   (b) heating the mixture above the melting points of the blend components;
   (c) agitating the mixture to disperse the blend in the polar liquid medium;
   (d) cooling the dispersion below the melting points of the blend components; and
   (e) recovering the adhesive powder blend.

2. The process of claim 1 wherein the weight ratio of polar liquid medium to melt blended adhesive composition is from 1:1 to 9:1, the nonionic surfactant is a block copolymer of ethylene oxide and propylene oxide and the weight ratio of nonionic surfactant to melt blend is from 0.05:1 to 5:1.

3. The process of claim 2 wherein the maleic anhydride grafted polyolefin is high density polyethylene grafted with from 0.3 to 4 weight percent maleic anhydride.

4. The process of claim 2 wherein the nonionic surfactant contains at least 50 percent ethylene oxide and has a molecular weight greater than 3500.

5. The process of claim 4 wherein the nonionic surfactant contains about 80 percent ethylene oxide and 20 percent propylene oxide and has a molecular weight from about 11250 to about 16250.

6. The process of claim 4 wherein the nonionic surfactant contains about 50 percent ethylene oxide and 50 percent propylene oxide and has a molecular weight of about 4500.

7. The process of claim 2 wherein the mixture is heated to 90° C. to 250° C. and the agitator tip speed is from 500 to 3,500 ft/mm.

8. The process of claim 1 wherein the melt blended adhesive composition additionally contains up to 30 weight percent elastomeric component.

9. The process of claim 1 wherein the particulate melt blended adhesive composition is pelletized.

10. A microfine adhesive blend powder produced by the process of claim 1.

11. The microfine adhesive blend powder of claim 10 having a median particle size from 5 to 250 micrometers wherein the particles are spherical or substantially spherical.

12. The microfine adhesive blend powder of claim 11 wherein the a maleic anhydride grafted polyolefin is high density polyethylene grafted with from 0.3 to 4 weight percent maleic anhydride.

* * * * *